(12) United States Patent
Matsuura

(10) Patent No.: US 11,924,084 B2
(45) Date of Patent: Mar. 5, 2024

(54) ROUTE SELECTION APPARATUS, ROUTE SELECTION METHOD AND ROUTE SELECTION PROGRAM

(71) Applicant: Nippon Telegraph and Telephone Corporation, Tokyo (JP)

(72) Inventor: Hiroshi Matsuura, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 161 days.

(21) Appl. No.: 17/617,664

(22) PCT Filed: Jun. 25, 2019

(86) PCT No.: PCT/JP2019/025120
§ 371 (c)(1),
(2) Date: Dec. 9, 2021

(87) PCT Pub. No.: WO2020/261373
PCT Pub. Date: Dec. 30, 2020

(65) Prior Publication Data
US 2022/0311697 A1 Sep. 29, 2022

(51) Int. Cl.
*H04L 45/122* (2022.01)
*H04L 45/02* (2022.01)
*H04L 45/24* (2022.01)
*H04L 45/48* (2022.01)

(52) U.S. Cl.
CPC ............ *H04L 45/122* (2013.01); *H04L 45/02* (2013.01); *H04L 45/24* (2013.01); *H04L 45/48* (2013.01)

(58) Field of Classification Search
CPC ....... H04L 45/122; H04L 45/02; H04L 45/24; H04L 45/48

USPC .......................................................... 709/238
See application file for complete search history.

(56) References Cited

U.S. PATENT DOCUMENTS

2006/0178150 A1* 8/2006 Kim ..................... H04W 40/08
455/445
2015/0049614 A1* 2/2015 Yamada ................ H04L 45/124
370/238

FOREIGN PATENT DOCUMENTS

JP       2015037253       2/2015

OTHER PUBLICATIONS

Hiroshi Matsuura, "Optimization Challenge: Maximizing Lifetime of a Data-Gathering Sensor Tree" (Year: 2016).*
Khuller et al., "Balancing minimum spanning trees and shortest path trees," Algorithmica, 1995, 14:305-321.
(Continued)

*Primary Examiner* — Hermon Asres
(74) *Attorney, Agent, or Firm* — Fish & Richardson P.C.

(57) ABSTRACT

A path selection apparatus 100 that selects a path in a sensor tree in a wireless sensor network including a plurality of nodes including a sensor node and a relay node includes a node information acquisition unit 110 that acquires information on the nodes and a path determination unit 130 that determines a path in the sensor tree based on the information on the nodes acquired by the node information acquisition unit 110, wherein the path determination unit 130 uses node costs of the sensor node and the relay node in the wireless sensor network and weights a path cost of a path passing through the relay node.

10 Claims, 14 Drawing Sheets

(56) References Cited

OTHER PUBLICATIONS

Kuo et al., "On the Construction of Data Aggregation Tree with Minimum Energy Cost in Wireless Sensor Networks: NP-Completeness and Approximation Algorithms," IEEE Transactions on Computers, 2016, 65(10):3109-3121.

Winter et al., "RPL: IPv6 Routing Protocol for Low-power and Lossy Networks," Internet Engineering Task Force (IETF), Mar. 2012, RFC 6550:1-157.

* cited by examiner

ROUTE SELECTION APPARATUS, ROUTE SELECTION METHOD AND ROUTE SELECTION PROGRAM

CROSS-REFERENCE TO RELATED APPLICATIONS

This application is a National Stage application under 35 U.S.C. § 371 of International Application No. PCT/JP2019/025120, having an International Filing Date of Jun. 25, 2019. The disclosure of the prior application is considered part of the disclosure of this application, and is incorporated in its entirety into this application.

TECHNICAL FIELD

The present invention relates to a path selection apparatus, a path selection method, and a path selection program.

BACKGROUND ART

Technologies relating to path selection in a sensor tree are known in the related art. Examples include technologies for data collection such as that of temperature and humidity in which a sensor tree is constructed of a plurality of sensor and relay nodes, and the sensor nodes aggregate and transmit their own and lower data to effectively collect data (see Non Patent Literatures 1 to 3).

CITATION LIST

Non Patent Literature

Non Patent Literature 1: T. Winter, et al., "RPL: IPv6 Routing Protocol for Low-power and Lossy Networks," RFC6550, IETF, March 2012.

Non Patent Literature 2: Tung-Wei Kuo, Kate Ching-Ju Lin, and Ming-Jer Tsai, "On the Construction of Data Aggregation Tree with Minimum Energy Cost in Wireless Sensor Networks: NP-Completeness and Approximation Algorithms," IEEE Transactions on Computers, vol. 65, issue 10, pp. 3109-3121, 2016.

Non Patent Literature 3: S. Khuller, B. Raghavachari, and N. Young, "Balancing Minimum Spanning Trees and Shortest-path Trees," Algorithmica, vol. 14, pp. 305-321, 1995.

SUMMARY OF THE INVENTION

Technical Problem

As the number of nodes increases, the amount of energy used (power consumption) required for data transfer also increases, such that it is important how data is aggregated and transmitted through the shortest paths. However, the sensor tree generation algorithm of the related art has a problem in that the amount of energy used is high because data does not always pass through the shortest path during data aggregation. Another problem is that it takes time to recalculate paths when a node is added or deleted.

The present invention has been made in view of the above circumstances and it is an object of the present invention to provide a path selection apparatus, a path selection method, and a path selection program that can reduce the total amount of energy used by nodes in a sensor tree and significantly reduce the processing time of tree generation.

Means for Solving the Problem

A path selection apparatus according to an aspect of the present invention is a path selection apparatus that selects a path in a sensor tree in a wireless sensor network including a plurality of nodes including a sensor node and a relay node, the path selection apparatus including a node information acquisition unit configured to acquire information on the plurality of nodes and a path determination unit configured to determine a path in the sensor tree based on the information on the plurality of nodes acquired by the node information acquisition unit, wherein the path determination unit is configured to use node costs of the sensor node and the relay node in the wireless sensor network and weight a path cost of a path passing through the relay node.

A path selection method according to another aspect of the present invention is a path selection method for selecting, by a path selection apparatus, a path in a sensor tree in a wireless sensor network including a plurality of nodes including a sensor node and a relay node, the path selection method including acquiring information on the plurality of nodes and determining a path in the sensor tree based on the information on the nodes acquired in the node information acquisition step, wherein the determining of a path includes using node costs of the sensor node and the relay node in the wireless sensor network and weighting a path cost of a path passing through the relay node.

Yet another aspect of the present invention provides a path selection program that causes a computer to function as the path selection apparatus.

Effects of the Invention

According to the present invention, it is possible to provide a path selection apparatus, a path selection method, and a path selection program that can reduce the total amount of energy used by the nodes in the sensor tree and significantly reduce the processing time of tree generation.

DESCRIPTION OF EMBODIMENTS

Figure 1:
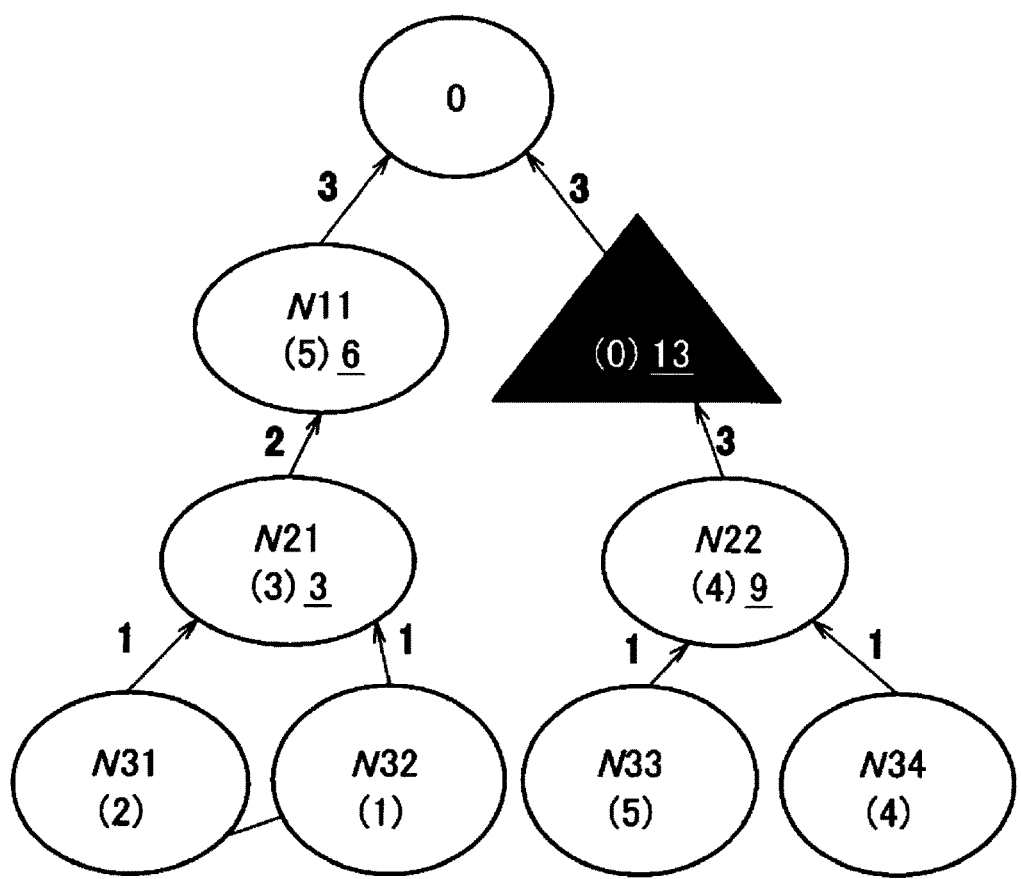
FIG. 1 is a diagram illustrating examples of the numbers of packets of links in a data collection tree.

Hereinafter, embodiments of the present invention will be described with reference to the drawings. In the description of the drawings, the same parts will be denoted by the same reference numerals and description thereof will be omitted.

A Routing Protocol for Low-power and Lossy Networks (RPL) has been standardized (see, for example, Non Patent Literature 1). According to RPL with sensors placed at specific locations, sensor reports can be collected through a data collection tree with sensor nodes measuring the humidity, temperature, gas concentration, or the like of target areas and a root sensor node can notify a base station of the sensor reports to enable analysis of the sensor reports. RPL also enables collection of information from gas meters, electric meters, or the like at regular intervals through the data collection tree. The data collection tree is a set of sensor nodes configured in a tree shape and relay nodes, which are located between the sensor nodes and responsible for relaying sensor reports, and is also called a sensor tree.

In each collection cycle, each sensor node in the data collection tree aggregates a sensor report of that sensor (where report size amounts vary from sensor to sensor) and sensor reports from all sensor nodes below that node in the tree into packets and transmits the packets to a higher sensor node in the tree. Because there is an upper limit (a data aggregation ratio: S) on the size of sensor reports that can be stored in one packet, the number of packets to be transmitted by each sensor/relay node in one data collection cycle is derived from the data aggregation ratio S and the size of sensor reports that the sensor/relay node needs to transmit. The amount of energy E(i) used by the sensor/relay node i (node i) in one data collection cycle can be represented by the following Expression 1.

[Math. 1]

$$E_{(i)} = E_{Tx} \times T_{N(i)} + E_{Rx} \times R_{N(i)} \quad \text{(EXPRESSION 1)}$$

In Expression 1, $E_{Tx}$ is the amount of energy required to transmit one sensor packet. $E_{Rx}$ is the amount of energy required to receive one sensor packet. $T_N(i)$ is the number of transmission packets that the node i needs to transmit in one data collection cycle. $R_N(i)$ is the number of reception packets that the node i needs to receive in one data collection cycle. When the size of a sensor report that the node i itself creates in one data collection cycle is d(i) and the total size of sensor reports of all lower nodes in the tree that the node transfers is d(below_i), $T_N(i)$ is represented by the following Expressions 2 and 3.

[Math. 2]

$$T_{N(i)} = (d(\text{below\_}i) + d(i))/S, ((d(\text{below\_}i) + d)) \text{ when } (d(\text{below\_}i) + d(i))\% \ S = 0 \quad \text{(EXPRESSION 2)}$$

[Math. 3]

$$T_{N(i)} = (d(\text{below\_}i) + d(i))/S + 1, ((d(\text{below\_}i) + \text{when } (d(\text{below\_}i) + d(i))\% \ S \neq 0 \quad \text{(EXPRESSION 3)}$$

In Expressions 2 and 3, "/" indicates the quotient of division and "%" indicates the remainder of division. From Expressions 2 and 3, it can be seen that there is a free space in a packet transmitted or received when the remainder is other than 0. Thus, reducing the free space of a packet on each link can also be considered to be an effective means for reducing the number of packets.

The total amount of energy $E_{tree}$ used in the entire tree T in one data collection cycle is the sum of the amounts of energy used by all tree nodes in one data collection cycle and can be expressed by the following Expression 4.

[Math. 4]

$$E_{tree} = \Sigma_{i \in T} E_{(i)} \quad \text{(EXPRESSION 4)}$$

Especially, sensors installed indoors are supplied with the power which they use from AC adapters, in which case it is necessary to reduce the total power supplied to the sensors as much as possible for the purpose of power reduction. Thus, a method of minimizing $E_{tree}$ represented by Expression 4 has been studied (see Non Patent Literature 2). Non Patent Literature 2 deals with two problems. One is a minimum energy cost aggregation tree (MECAT) problem. This MECAT problem is a problem of minimizing the total energy which is used by tree nodes (nodes in the tree) in a wireless sensor network (WSN) having no relay nodes that do not generate sensor reports and are used for the purpose of transferring only sensor reports of sensor nodes below them in the tree. The other is an MECAT-RN (MECAT with Relay Node) problem. This MECAT-RN problem is a problem of minimizing the total energy which is used by all tree nodes including relay nodes in a WSN.

In Expression 1 above, $E_{Tx}$ and $E_{Rx}$ are fixed values. Thus, the problems of minimizing the total number of packets transmitted and received on all links in the tree (which are adjacency relations used for tree nodes to transfer sensor reports) in both the WSN having no relay nodes and the WSN having relay nodes are equivalent to the MECAT problem and the MECAT-RN problem. That is, the MECAT problem and the MECAT-RN problem are equivalent to the following Expression 5, which is equivalent to Expression 6 when $E_{Tx}$ and $E_{Rx}$ are fixed values.

[Math. 5]

$$\min_{T \in T(G)} \sum_{e \in E_T} (E_{Tx} + E_{Rx}) \left\lceil \frac{z(e)}{s} \right\rceil \quad \text{(EXPRESSION 5)}$$

[Math. 6]

$$\min_{T \in T(G)} \sum_{e \in E_T} \left\lceil \frac{z(e)}{s} \right\rceil \quad \text{(EXPRESSION 6)}$$

In Expressions 5 and 6, G represents a wireless sensor network (WSN) and T(G) represents a set of trees in G. Also, e represents a link in the tree and z(e) represents the size of sensor reports transmitted on e in one data collection cycle, such that it holds that z(e)=d(below_i)+d(i) where i represents the transmitting node on e.

FIG. 1 illustrates examples of the numbers of packets of links in a data collection tree. Here, the data aggregation ratio S is 5. Node 0 indicates a root node, white circle nodes starting with N indicate sensor nodes, and black triangle nodes indicate relay nodes. Relay nodes are responsible for relaying sensor nodes having no adjacency relations therebetween and do not transmit their own sensor reports to the root node 0. A number in parentheses in each node indicates the size of a sensor report d(i) generated by that node and an underlined number next to it indicates d(below_i). Solid arrows (→) between the nodes indicate links in the tree and the directions of the solid arrows indicate the transmission directions of packets. A number next to each link in the tree indicates the number of packets transmitted on that link in one data collection cycle.

Non Patent Literature 2 illustrates that it is effective to apply a Light Approximate Shortest-path Tree (LAST) algorithm (see Non Patent Literature 3) to the MECAT-RN problem. The LAST algorithm (hereinafter sometimes simply referred to as LAST) is given parameters α and β. In a tree created by (α, β)-LAST, it is guaranteed that the distance from a root node is not more than α times the shortest path from the root node at each node in the tree and the entire cost of the tree (the sum of tree link costs) is not more than β times the tree cost of a minimum spanning tree (MST). Non Patent Literature 2 proves that the total amount of energy of a tree created by applying (3,2)-LAST to a WSN including relay nodes is limited to not more than 7 times that of an optimum solution (a minimum energy tree).

Figure 2:
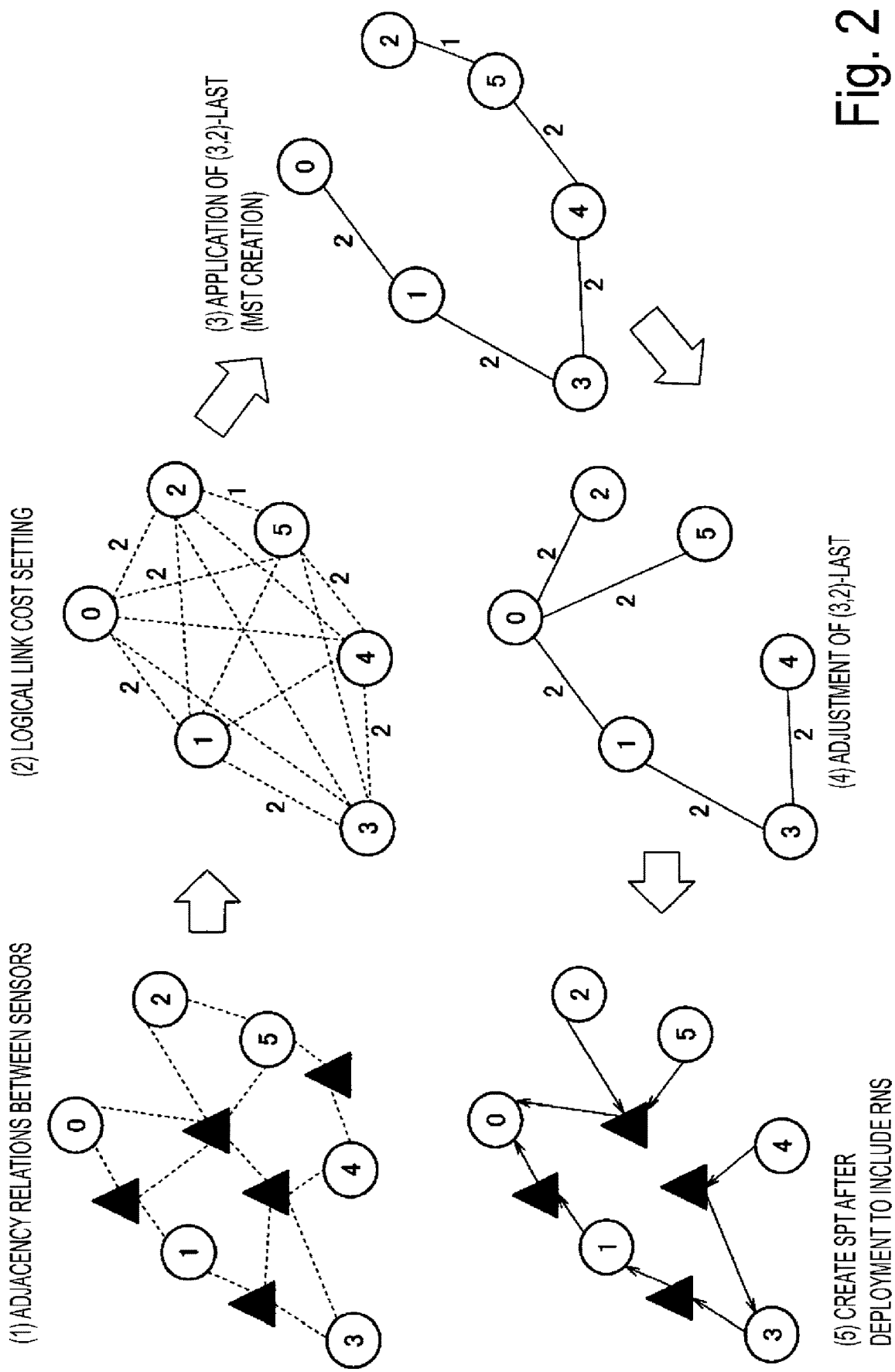
FIG. 2 is a diagram illustrating a (first) exemplary application of (3,2)-LAST.

FIG. 2 illustrates a (first) exemplary application of (3,2)-LAST to the MECAT-RN problem. Numbers (1), (2), (3) . . . in parentheses illustrated in FIG. 2 indicate the order of processing. (1) illustrates a WSN including relay nodes (RNs). In FIG. 2, adjacency relations between nodes in the WSN are illustrated as dotted lines. Here, an adjacency relation means a relation in which communication (connection) is possible. An example of an adjacency relation is a relation in which one node is within the reach of a radio signal (for example, a received signal strength indicator (RSSI)) from the other node. First, in (2), logical links between sensor nodes including no relay nodes are created. The logical links indicate connections between the sensor nodes excluding the relay nodes. Here, each logical link cost is the smallest number of hops including relay nodes between the sensor nodes. In (2), logical link costs are illustrated as numbers written next to the logical links, while the link costs of links without numbers are all 3. (3) and (4) are applications of the (3,2)-LAST algorithm. First, in (3), an MST is created in the network of (2). The MST is a tree spanning all nodes (the sensor nodes 0 to 5) which minimizes the sum of logical link costs of the tree. An algorithm such as Prim is used to create the MST.

In (4) which is a feature of (3,2)-LAST, the shortest path costs are compared at each node in the MST. If the condition of a path in MST>(3×shortest path from root node) is satisfied, the MST path is replaced with the shortest path from the root node. In this example, it can be seen that paths to the nodes 5 and 2 in the MST are replaced with shortest paths. (5) illustrates the result of deploying the tree created through the (3,2)-LAST algorithm in (4) such that it includes relay nodes. If there are a plurality of paths from the node 0 to a certain node as a result of (5), a shortest path is selected from the plurality of paths, while a path is uniquely determined for each node in the example in FIG. 2.

Figure 3:
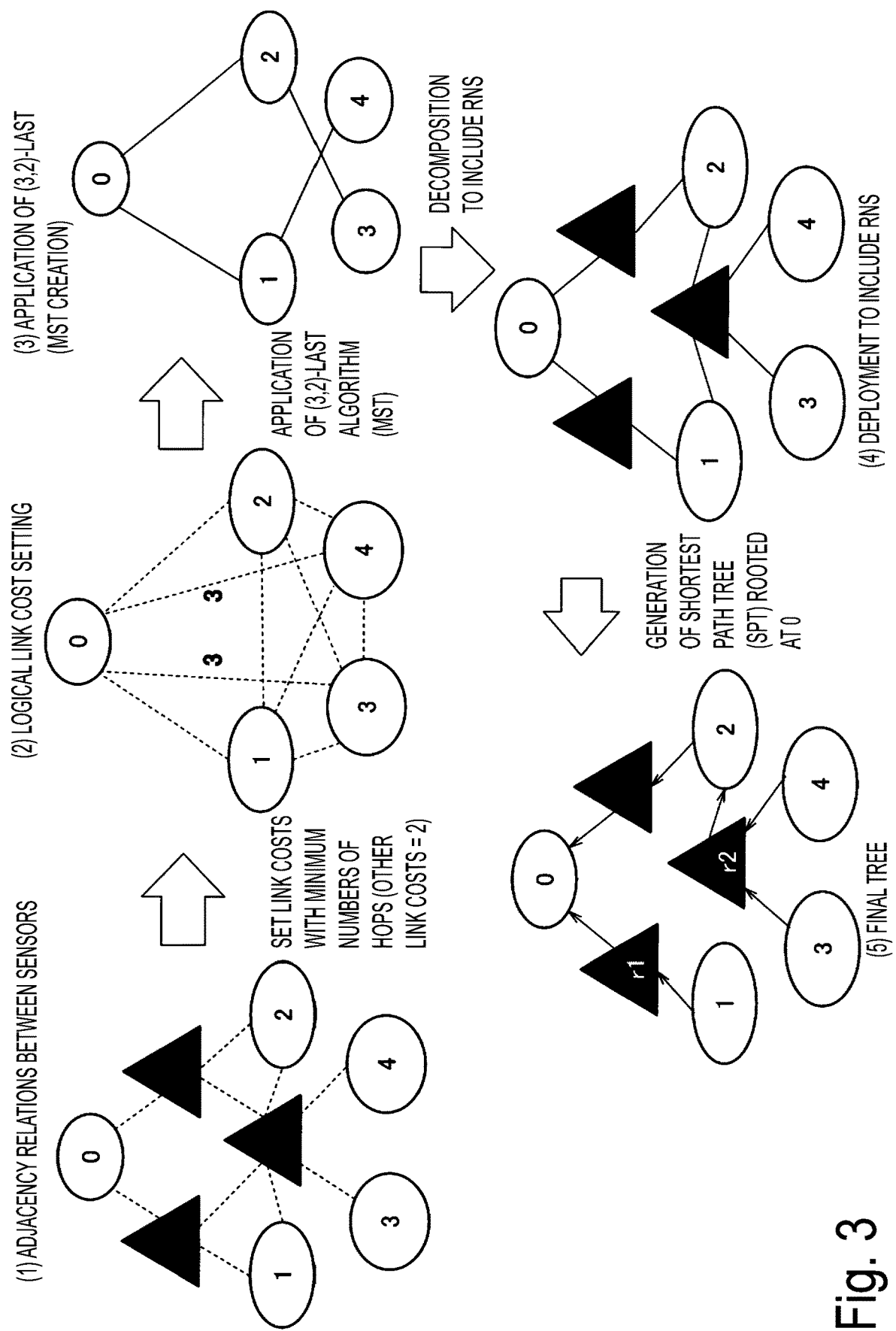
FIG. 3 is a diagram illustrating a (second) exemplary application of (3,2)-LAST.

FIG. 3 illustrates a (second) exemplary application of (3,2)-LAST to the MECAT-RN problem. FIG. 3 illustrates a countermeasure when a plurality of paths are output for one node as a result of decomposition into relay nodes. Similarly, in this example, in (2), logical links between sensor nodes including no relay nodes are created. In (2), logical link costs are illustrated as numbers written next to the logical links, while the link costs of links without numbers are all 2. In (3), an MST is created based on the logical links set in (2). In this example, because there is no node that satisfies the condition of a path in MST>(3×shortest path from root node), the result of (3) is deployed as is such that it includes relay nodes as in (4). However, it can be seen that nodes 1 to 4 have two paths to root node 0. In that case, shortest paths are selected in order from that of the node 1. Because the shortest path from the node 1 is that of nodes via a relay node (r1), the link between the nodes 1 and r2 is deleted. As a result, a path from each node to the node 0 is uniquely determined and a final tree of (5) is generated.

Non Patent Literature 2 proves that applying the (3,2)-LAST algorithm to the MECAT-RN problem theoretically ensures that the amount of energy used has an upper limit of not more than 7 times that of an optimal tree that can minimize the amount of energy used. However, on the other hand, there is a concern with the (3,2)-LAST algorithm that the energy consumption in the tree may be up to 7 times that of the optimum tree. In particular, when the number of sensor nodes is large or the data aggregation ratio S is small, the number of hops from each node to the root node may be great and the energy used in the tree tends to be large. The reason for this is that the number of times a shortest hop path from each node to the root node is used is small although the entire number of links in the tree is also small because the (3,2)-LAST algorithm uses an MST as a base for the tree.

In addition, there is a concern that processing time will increase when the (3,2)-LAST algorithm is applied. The reason for this is that it is necessary to set logical links between sensor nodes as in (2) in FIGS. 2 and 3. For this setting, it is necessary to obtain shortest hop paths from each sensor node to other sensor nodes using the Dijkstra algorithm and the computational complexity is O (1 log n). Here, 1 is the number of adjacency relations (links) in the WSN and n is the total number of relay and sensor nodes in the WSN. In (2) in FIGS. 2 and 3, because it is necessary to repeat the Dijkstra algorithm the same number of times as the number of sensor nodes, there is a problem in that the processing time of tree creation increases when the number of nodes and the number of adjacency relations between the nodes increase. The processing of sensor tree generation is performed not only when an initial tree is generated immediately after sensors are placed, but also when a sensor tree is reconstructed such as when a new sensor node is added to the WSN. Therefore, a long processing time of sensor tree generation leads to a problem that sensor reports cannot be collected for a long time.

An embodiment of the present invention proposes a new tree generation algorithm to replace the (3,2)-LAST algorithm applied to the MECAT-RN problem. Specifically, the embodiment reduces the total amount of energy used by nodes in the sensor tree. Further, an embodiment of the present invention aims to significantly reduce the processing time of tree generation by eliminating the need to obtain logical link costs as in (2) in FIGS. 2 and 3.

Figure 4:
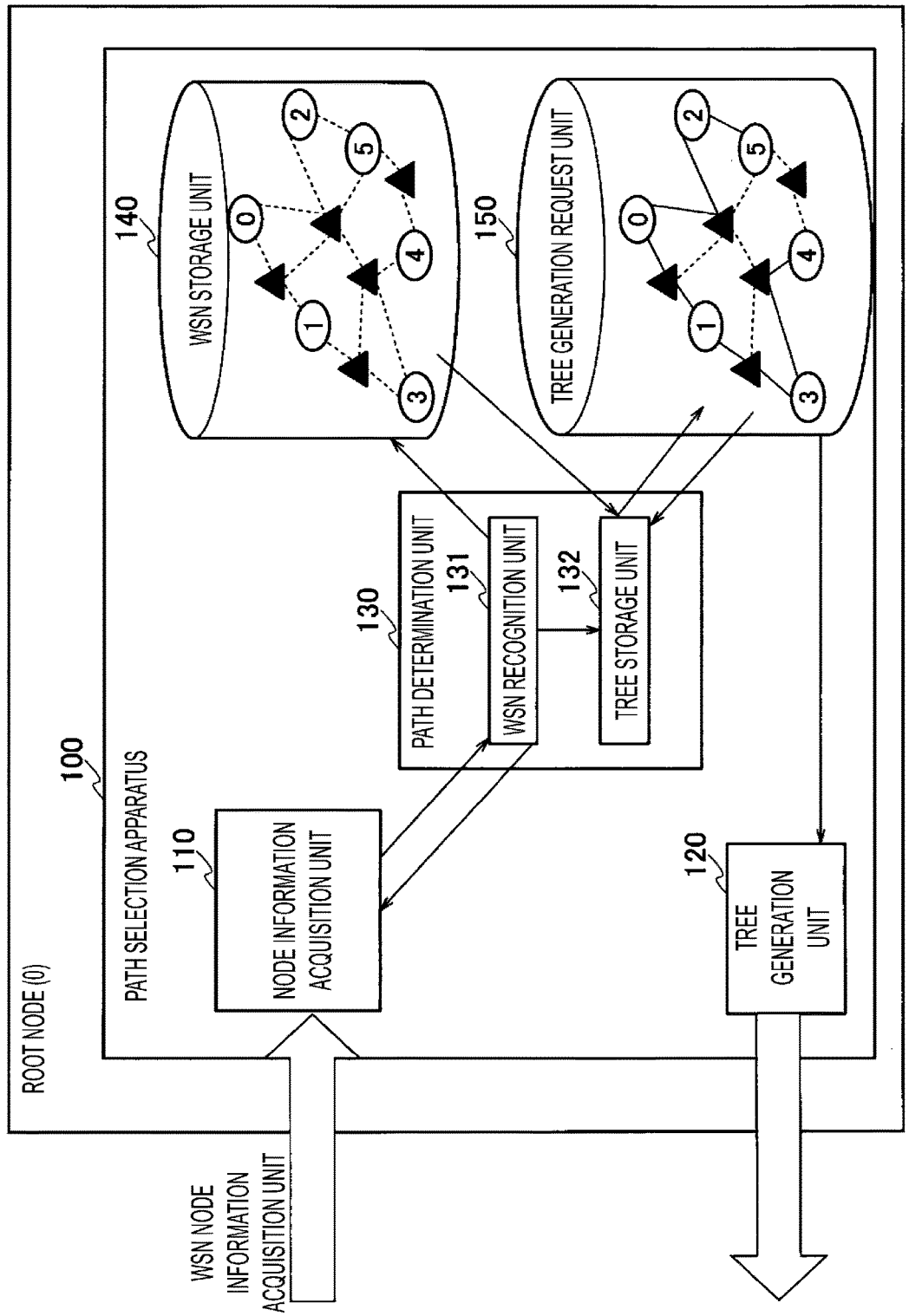
FIG. 4 is a diagram illustrating an example of a functional configuration of a path selection apparatus of the present embodiment.

Example of Functional Configuration of Path Selection Apparatus FIG. 4 illustrates an example of a functional configuration of a path selection apparatus 100 according to an embodiment of the present invention. In the present embodiment, it is assumed that a sensor tree in which a data collection cycle of storing sensor reports from lower nodes in packets and transmitting the packets to higher nodes is repeated is generated as a sensor tree composed of a plurality of nodes (sensor/relay nodes).

The path selection apparatus 100 selects tree paths that can reduce the total amount of energy used in a tree represented by Expression (5). Specifically, as illustrated in FIG. 4, the path selection apparatus 100 includes a node information acquisition unit 110, a tree generation request unit 120, a path determination unit 130, a WSN storage unit 140, and a tree storage unit 150. The path determination unit 130 includes a WSN recognition unit 131 and a tree generation unit 132. In this example, the path selection apparatus 100 is included in root node (0). However, the path selection apparatus 100 is not necessarily included in the root node (0) and may be included in an apparatus connected to the root node (0) such as a base station.

The node information acquisition unit 110 acquires information on nodes adjacent to the root node (0) and acquires information on nodes adjacent to the nodes. The node information acquisition unit 110 repeats the acquisition of information on nodes in the same manner, and as a result, can acquire adjacency relations of all nodes belonging to a WSN to which the root node (0) belongs.

The WSN recognition unit 131 in the path determination unit 130 can recognize a WSN configuration from the adjacency relations of the nodes. The WSN recognition unit 131 stores the WSN configuration in the WSN storage unit 140 as a result of the recognition.

The tree generation unit 132 in the path determination unit 130 generates a tree. The (3,2)-LAST algorithm illustrated in the examples in FIGS. 2 and 3 can be considered to be used for the MECAT-RN problem as an example to generate the tree. The tree generation method proposed in the present embodiment (hereinafter simply referred to as a "method of the embodiment") also operates in the tree generation unit 132. The tree generated by the tree generation unit 132 is stored in the tree storage unit 150.

Finally, the generated tree configuration is reflected in a tree on an actual WSN by the tree generation request unit 120 setting a path for each node.

Exemplary Operation of Path Selection Apparatus

Figure 5:
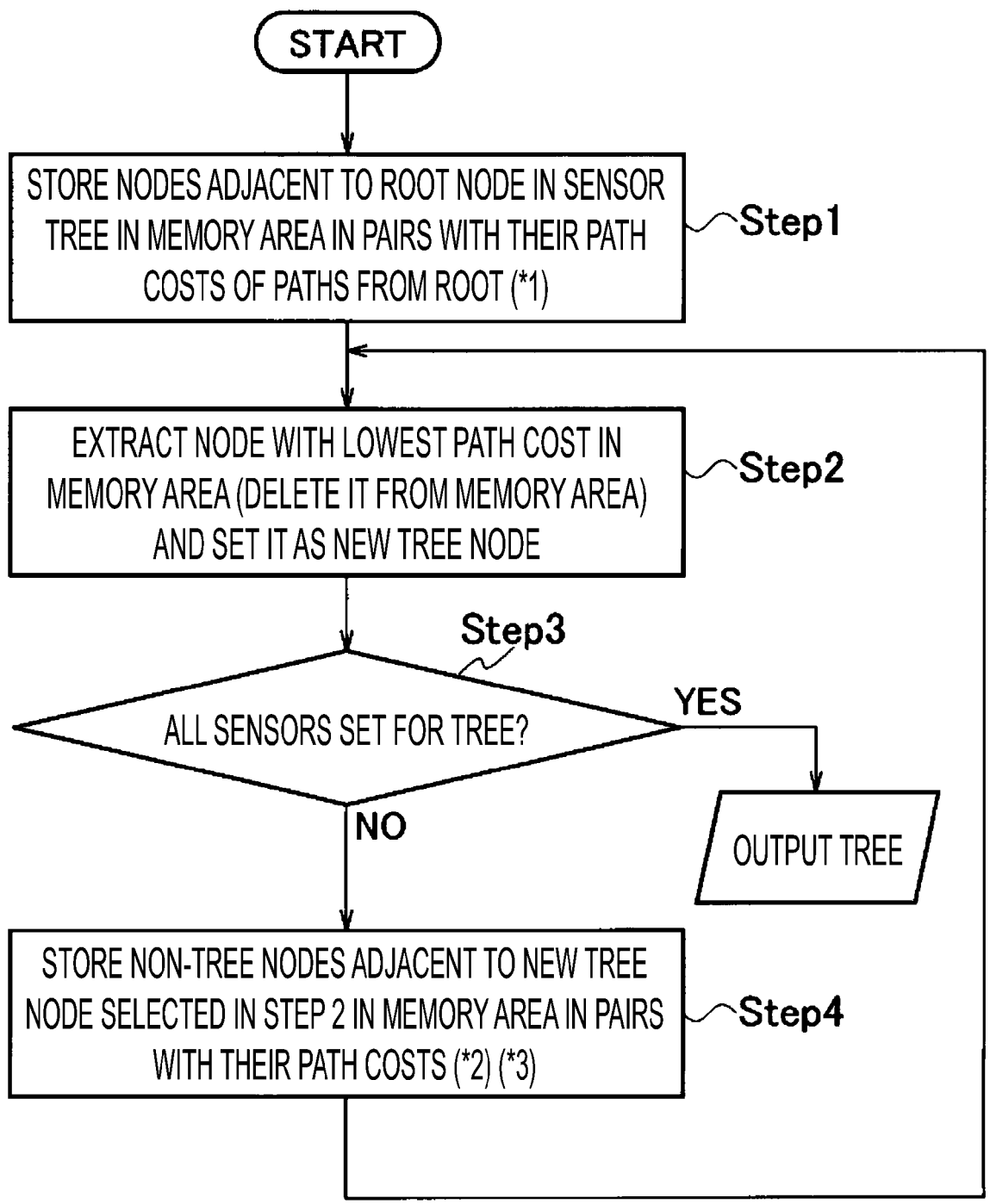
FIG. 5 is a flowchart illustrating an exemplary operation of the path selection apparatus of the present embodiment.

FIG. 5 is a flowchart illustrating an exemplary operation of the tree generation unit 132 in the path selection apparatus 100 according to the embodiment of the present invention. The flowchart in FIG. 5 will be described below.

In step 1, the tree generation unit 132 stores all nodes adjacent to the root node (0) in a memory area in pairs with the path costs of paths from the root node (0) to the adjacent nodes. Here, path costs (*1) in FIG. 5 are equal to the node costs of the adjacent nodes, which are 1 for sensor nodes and 1+weight for relay nodes. This weight is given in advance as a parameter or an expression and is a uniform value for all relay nodes.

In step 2, the tree generation unit 132 extracts a node, which has the lowest path cost among nodes which have been stored in the memory area in step 1, from the memory area and sets the extracted node as a new tree node. However, if the path costs of a plurality of nodes are the same, one of the nodes is arbitrarily selected. At that time, the new tree node is deleted from the memory area.

In step 3, the tree generation unit 132 determines whether or not there is a sensor node in the WSN which has not yet been set as a tree node after setting the new tree node in step 2. If all sensor nodes have been set as tree nodes (Yes), the tree generation unit 132 outputs the tree as a final output tree. If there is a sensor node in the WSN that has not yet been set as a tree node (No), the tree generation unit 132 performs step 4 processing.

In step 4, the tree generation unit 132 stores non-tree nodes adjacent to the new tree node selected in step 2 in the memory area in pairs with path costs (*2). The path cost (*2) is the path cost of the new tree node plus the node cost of the adjacent node. The path costs (*2) differ from the path costs (*1) in that the path cost of each adjacent node is the sum of the path cost of the path to the new tree node and the node cost of the adjacent node. The value of the node cost of the adjacent node is obtained in exactly the same way as (*1). Further, in (*3) in FIG. 5, if the path cost of a path to an adjacent node has already been stored in the memory area, the tree generation unit 132 overwrites the path cost in the memory area, only when the overwriting decreases the path cost, and also changes a parent node of the adjacent node in the memory area based on the new path.

Method of Embodiment

Figure 6:
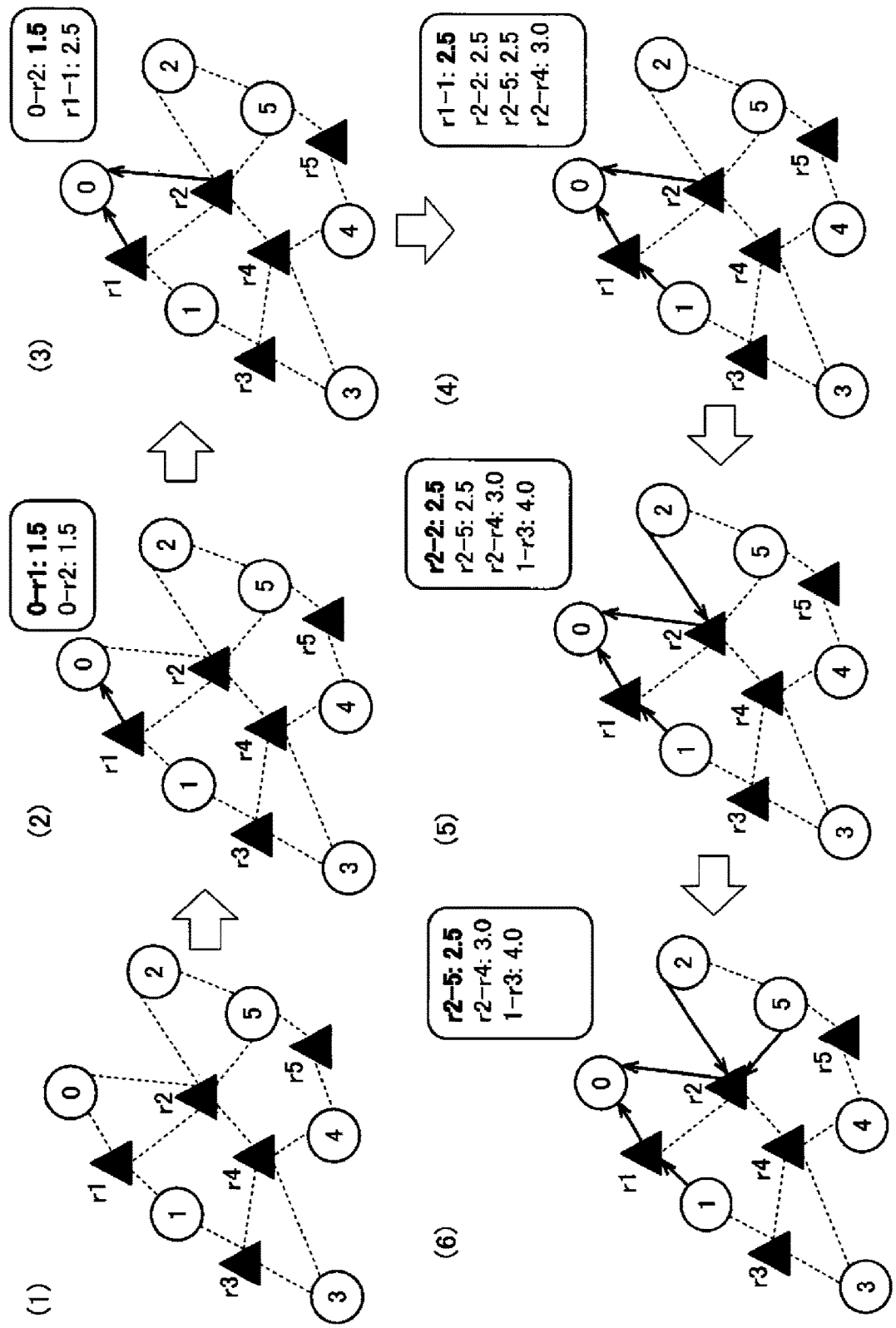
FIG. 6 is a diagram illustrating an exemplary application of the present embodiment.
Figure 7:
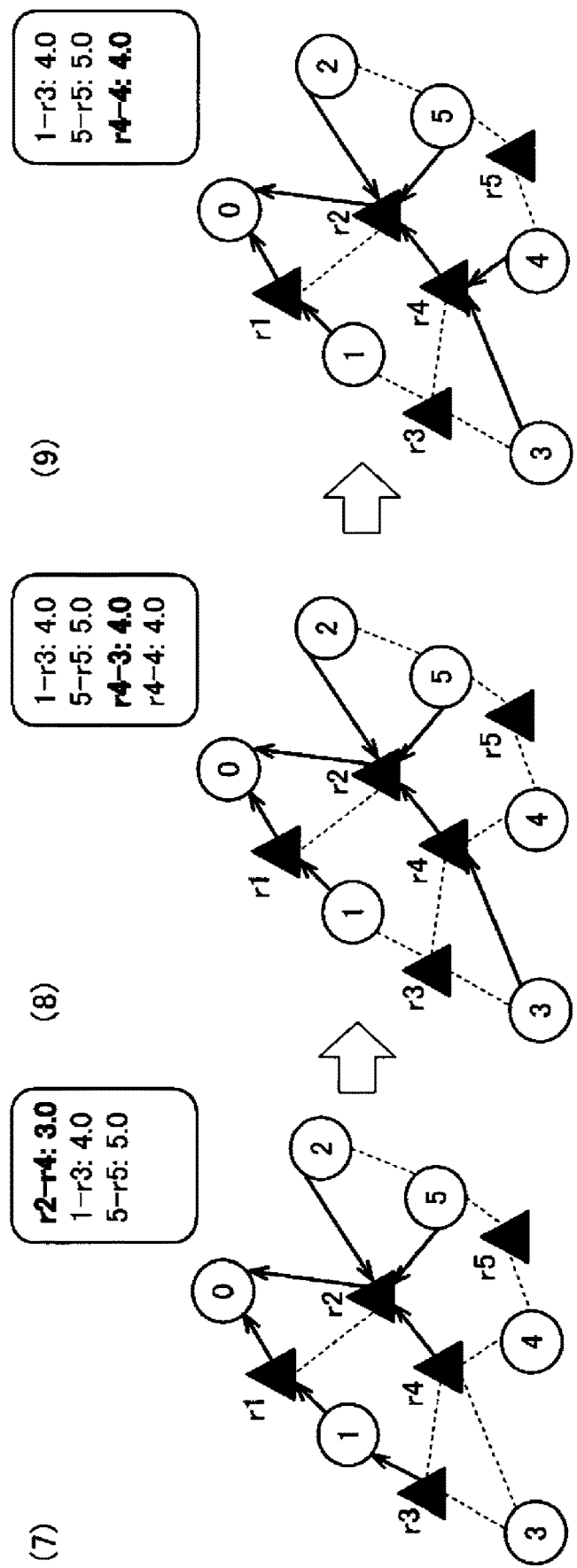
FIG. 7 is a diagram illustrating an exemplary application of the present embodiment.

FIGS. 6 and 7 illustrate an example of tree generation when the method of the embodiment is applied to the MECAT-RN problem. Here, the data aggregation ratio S is 5 and a is 0.1. In addition, weight=aS=0.5. (1) in FIG. 6 illustrates a WSN to which the method of the embodiment is applied. This WSN is the same as the WSN in FIG. 2. (2) in FIG. 6 illustrates a state after nodes adjacent to the root node (0) are registered in a memory area in pairs with their path costs (step 1 in FIG. 5). The root node (0) is designated as a parent node of the adjacent nodes r1 and r2 in the tree because the adjacent nodes r1 and r2 are adjacent to the root node (0) as illustrated in (2) in FIG. 6. In addition, a path cost of a path from the root node (0) to each node is stored in pair with the node in the memory area next to the node. In (2) in FIG. 6, 1+weight=1.5 is set for both the nodes r1 and r2 because both are relay nodes. When there are a plurality of the same minimum path costs in the memory area like this, an arbitrary one of the nodes is selected as a new tree node in step 2 in FIG. 5. In this case, the node r1 is selected and set as a new tree node as illustrated in (2) in FIG. 6.

In step 3 in FIG. 5, it is determined that there is a sensor node in the WSN that has not yet been set for a tree and thus the process proceeds to step 4. At this time, node 1 which is adjacent to the new tree node r1 and has not yet been set as a tree node is set in the memory area with r1 designated as its parent node as in (3) in FIG. 6. The path cost for this is 2.5, which is obtained by adding 1 which is the node cost of the node 1 to 1.5 which is the path cost of the path to the node r1. It can be seen that, after the adjacent node is registered, r2 which is a node having a minimum path cost in the memory area is selected and set as a new tree node under the root node (0) in step 2 in FIG. 5.

In (4) in FIG. 6, nodes 2, 5, and r4 which are adjacent to the new tree node r2 and have not yet been set as tree nodes are registered in the memory area with the node r2 designated as their parent in the tree. Thereafter, the node 1 which is one of the nodes having the minimum path cost in the memory area is set as a new tree node under the root node (0) as illustrated.

In (5) in FIG. 6, node r3 which is adjacent to the new tree node 1 and has not yet been set as a tree node is registered in the memory area with the node 1 designated as its parent in the tree. Thereafter, the node 2 which has the minimum path cost in the memory area is set as a new tree node under the node r2 as illustrated.

In (6) in FIG. 6, the node 5 which is adjacent to the new tree node 2 and has not yet been set as a tree node is considered to be registered in the memory area with the node 2 designated as its parent in the tree. At this time, the node 5 has already been registered with a path cost of 2.5 and the node r2 as its parent as illustrated in (5) in FIG. 6. When the parent is the node 2, the path cost is 3.5. Because this path cost is not less than 2.5, the path cost of the node 5 and its parent in the tree are not updated. Thus, the memory area is not updated in (6) in FIG. 6. However, the path cost and the parent are replaced if the path with the node 2 as the parent has a path cost less than 2.5. (6) in FIG. 6 illustrates that the node 5 which has the minimum path cost in the memory area is set as a new tree node under the node r2.

In (7) in FIG. 7, node r5 which is adjacent to the new tree node 5 and has not yet been set as a tree node is registered in the memory area with the node 5 designated as its parent in the tree. Thereafter, the node r4 which has the minimum path cost in the memory area is set as a new tree node under the node r2 as illustrated.

In (8) in FIG. 7, nodes 3 and 4 which are adjacent to the new tree node r4 and have not yet been set as tree nodes are registered in the memory area with the node r4 designated as their parent in the tree. r3 is also considered to be registered in the memory area as an adjacent node that has not yet been set as a tree node. However, r3 has already been registered in the memory area with the node 1 as its parent and its path cost is 4.0. When the parent is the node r4, the path cost is 4.5, which is not less than 4.0. Therefore, the memory area is not rewritten. Thereafter, the node 3 which has the minimum path cost in the memory area is set as a new tree node under the node r4 as illustrated.

In (9) in FIG. 7, the node r3 which is adjacent to the new tree node 3 and has not yet been set as a tree node is considered to be registered in the memory area with the node 3 designated as its parent in the tree. However, the registration is not updated because the path cost of the path with the node 3 as the parent is higher than that of the path with the node 1 as the parent which has already been registered. Thereafter, the node 4 which has the minimum path cost in the memory area is set as a new tree node under the node 4 as illustrated.

Thereafter, it is determined in step 3 in FIG. 5 that all sensor nodes have been set as tree nodes and thus the tree of (9) in FIG. 7 becomes a final output.

Figure 8:
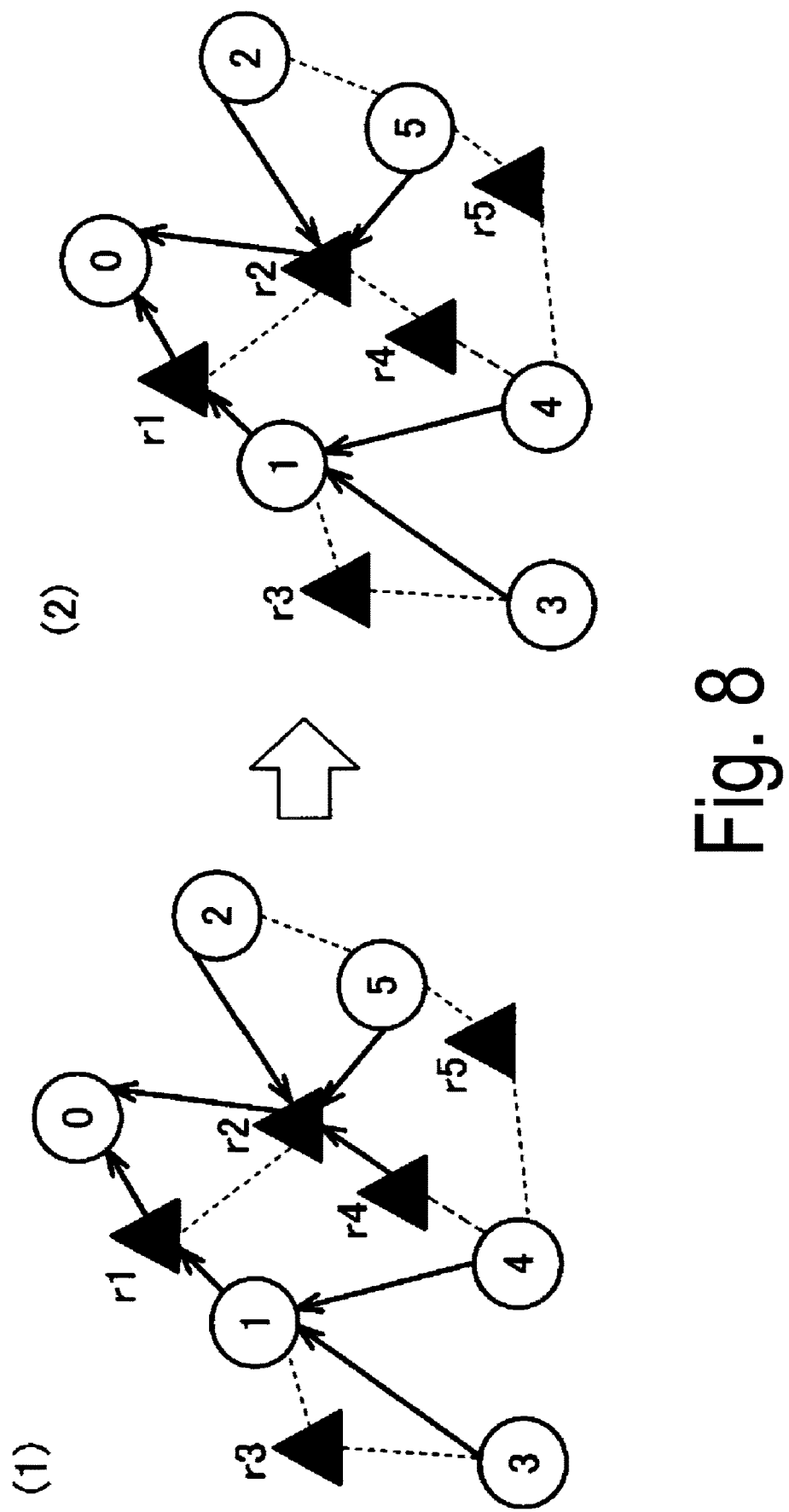
FIG. 8 is a diagram illustrating an example of deleting an unnecessary relay node in the present embodiment.

FIG. 8 illustrates an example of deleting an unnecessary relay node from a tree in the method of the embodiment. (1) in FIG. 8 illustrates an example of a tree at the time when it is determined in step 3 in FIG. 5 that all sensor nodes have been set as tree nodes. At that time, node r4 is a relay node and has been set as a tree node. The number of sensor reports that the node r4 transfers to node r2 which is its parent in the tree is 0 because the node r4 does not have its own child node. Therefore, the node r4 is meaningless as a member of the tree and is thus deleted from the tree as illustrated in (2) in FIG. 8.

Effects of Embodiment of Present Invention

As can be seen by comparing a tree created based on the MST in FIG. 2 with a tree generated using the method of the embodiment in FIGS. 6 and 7, the tree generated using the method of the embodiment has an effect of reducing the average number of hops from the root node (0) to each sensor node. This can solve the problem in the MST-based tree that the energy consumption of paths to the root node (0) from nodes that have large numbers of hops from the root increases when the value of the data aggregation ratio S is small. The problem that the number of sections with large numbers of hops increases in the MST-based tree is particularly marked when the number of nodes in the WSN is large.

In addition, as is clear from the flowchart in FIG. 5, the algorithm of the method of the embodiment can run with the same computational complexity O (1 log n) as one execution of the Dijkstra algorithm and does not require n executions of the Dijkstra algorithm which are required when the logical links of (2) in FIGS. 2 and 3 are created. This can achieve a significant improvement in processing speed.

It is also clear from FIGS. 6 and 7 that, as the weight increases, the path costs of paths from the root node (0) which include relay nodes increase and it becomes more difficult to select relay nodes. When the data aggregation ratio S is large, reducing the number of relay nodes used and reducing the entire number of links in the tree is effective for energy reduction, while the entire number of links in the tree can be reduced by automatically increasing the weight in proportion to the data aggregation ratio S.

Figure 9:
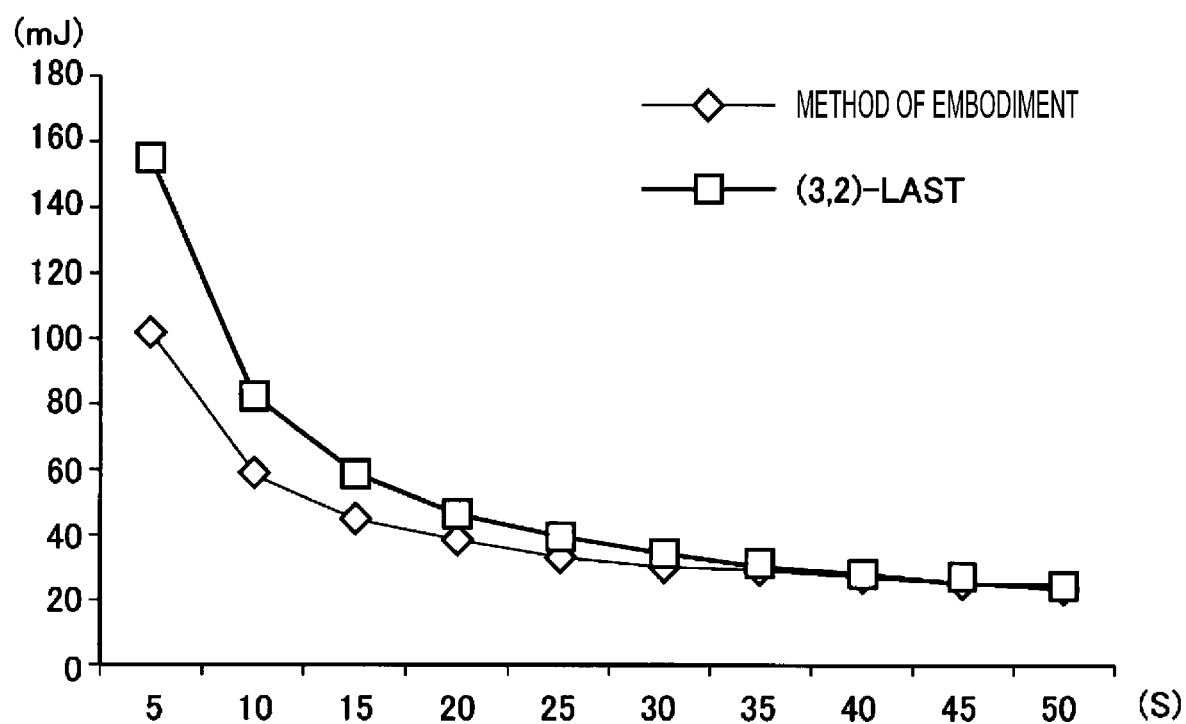
FIG. 9 is a diagram illustrating the effects of the present embodiment.
Figure 10:
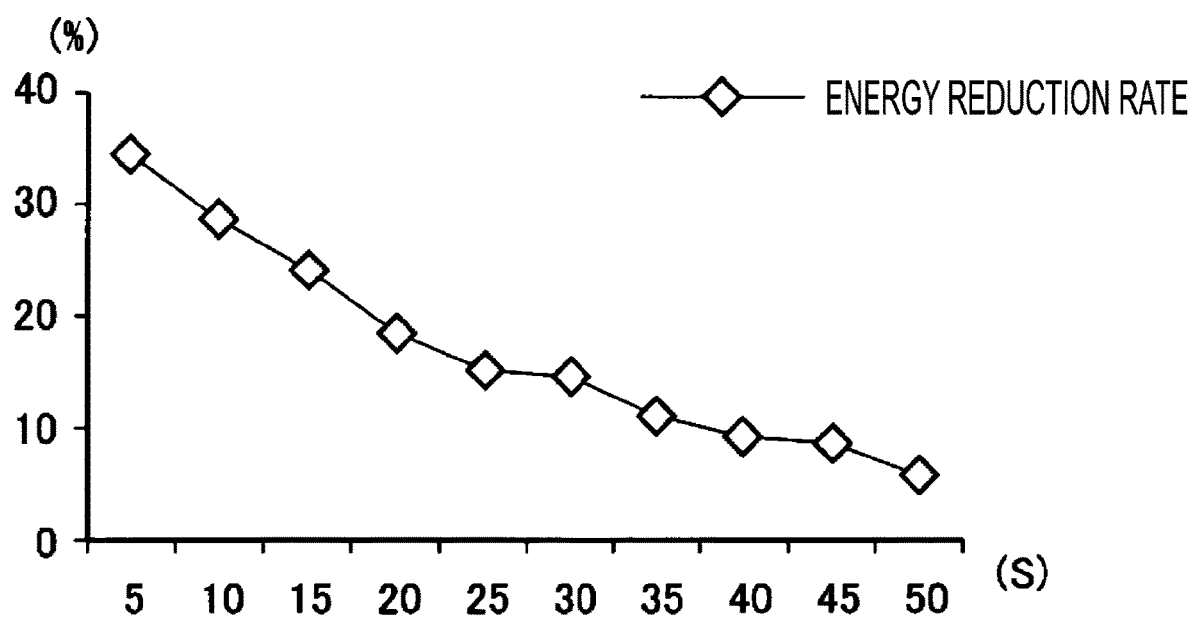
FIG. 10 is a diagram illustrating the effects of the present embodiment.
Figure 11:
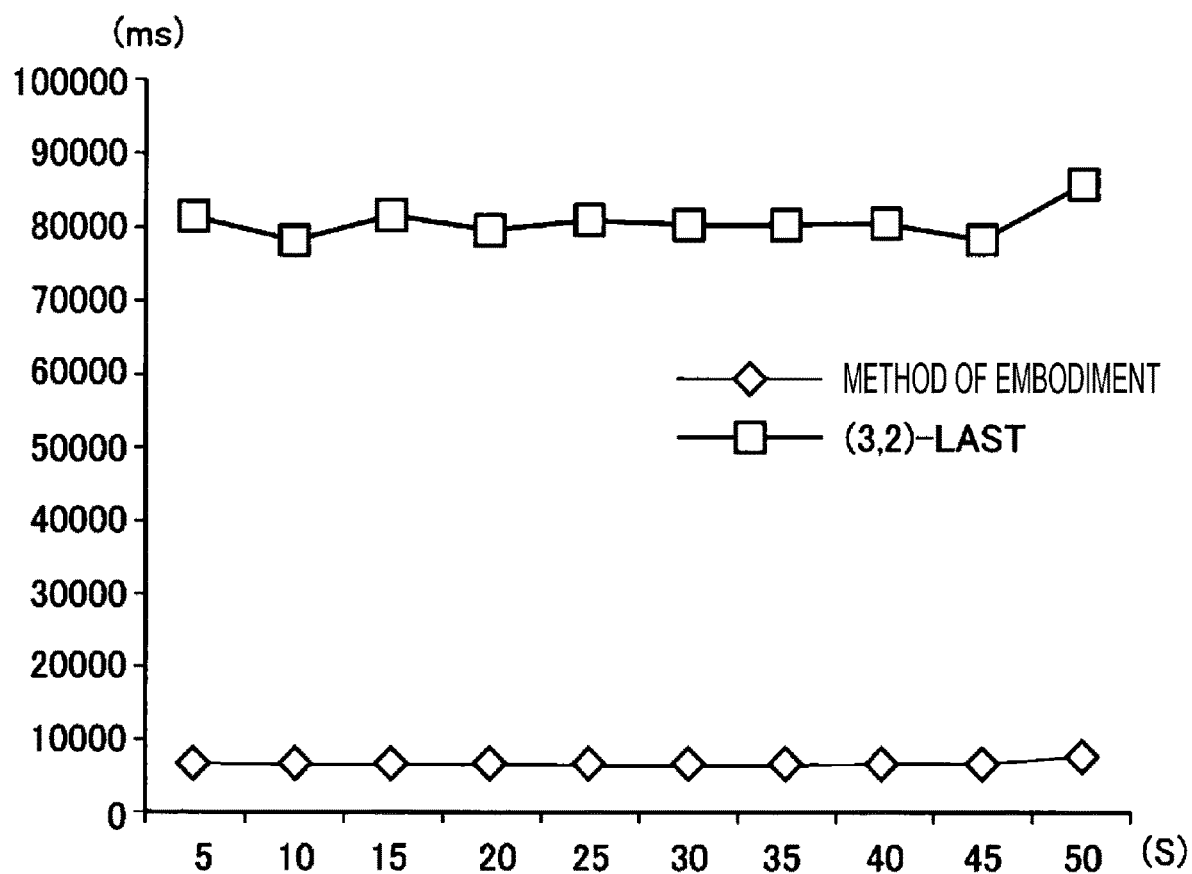
FIG. 11 is a diagram illustrating the effects of the present embodiment.

FIGS. 9 to 11 illustrate the effect of reducing the number of packets and simulation results of processing load according to the present embodiment. Here, in a computer simulation environment, 600 sensor nodes and 2400 relay nodes were randomly placed on a plane of 700 m×700 m with the shortest distance between two nodes set to 10 m and then adjacency relations were created between sensor nodes which are within a sensor signal transmission distance of 25 m. As a result, an average of about 11.8 adjacency relations of nodes per sensor node were created. The transmission/reception energy of each node was $E_{Tx}$=100 nJ/bit and $E_{Rx}$=50 nJ/bit and one packet was 192 bytes.

FIG. 9 illustrates the effect of energy reduction of the method of the embodiment. Specifically, FIG. 9 illustrates the respective energy consumption (mJ) per data collection cycle of trees generated using the method of the related art ((3,2)-LAST) and the method of the embodiment where the size of reports from each sensor is given a uniform random number from 1 to 5 as an evaluation condition. The weight of the method of the embodiment was defined as weight=aS, and a=1/26 was set.

The data aggregation ratio S is illustrated on the horizontal axis. When the data aggregation ratio S is small, the size of sensor reports stored in one packet is small, such that the number of transmissions and receptions in the tree increases and energy consumption increases. On the other hand, the method of the embodiment can significantly reduce energy when the data aggregation ratio S is small as illustrated in FIG. 9.

FIG. 10 illustrates the energy reduction rate for each data aggregation ratio S when the method of the embodiment was used. This energy reduction rate indicates the rate of energy reduction compared to the method of the related art ((3,2)-LAST)). As illustrated in FIG. 10, energy can be reduced at every data aggregation ratio S, but the reduction rate at S=5 is significantly higher at 34.6% compared to 5.68% at S=50.

FIG. 11 illustrates the effect of shortening the processing time of tree generation when the method of the embodiment was used. Again, the subject of comparison is the method of the related art ((3,2)-LAST). As illustrated in FIG. 11, (3,2)-LAST takes about 80 seconds, whereas the method of the embodiment takes about 7 seconds regardless of the data aggregation ratio S. It can be seen that the method of the embodiment can achieve a significant reduction in the processing load.

Figure 12:
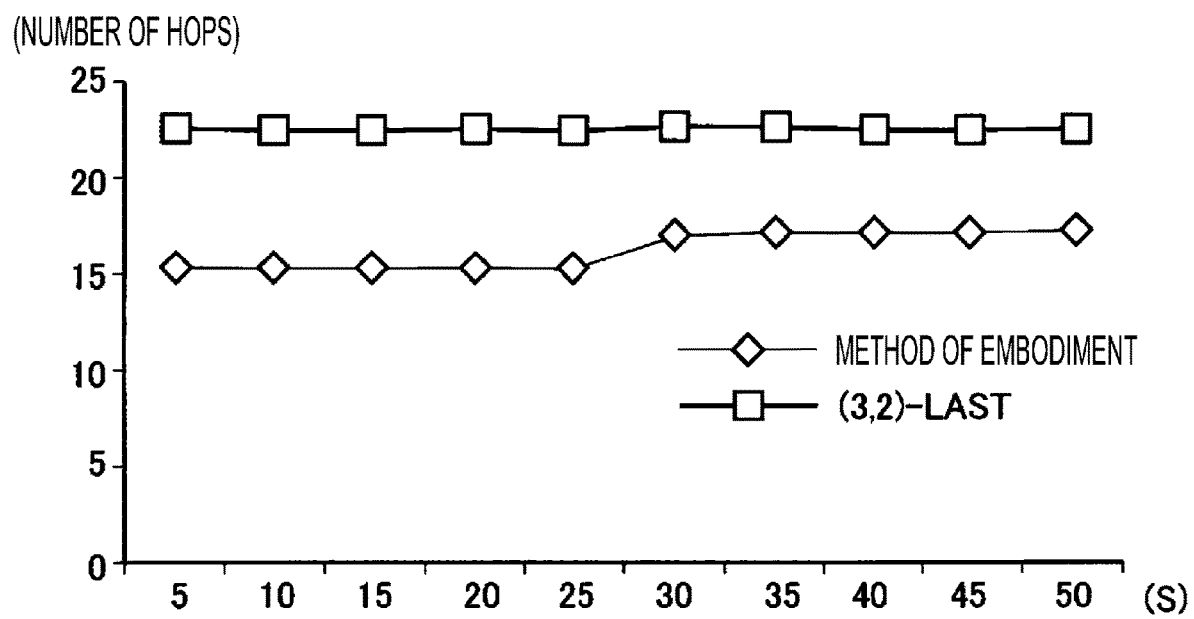
FIG. 12 is a diagram illustrating the effects of the present embodiment.

FIG. 12 illustrates a comparison of the average number of hops in a tree of the embodiment with that of the method of the related art ((3,2)-LAST). Specifically, FIG. 12 illustrates the respective average numbers of hops from leaf nodes (tree nodes having no child node) to the root node (0) in trees generated using the method of the embodiment and (3,2)-LAST. Having small numbers of hops is highly effective when the data aggregation ratio S is small. In the method of the embodiment, weight=aS is defined and thus it can be seen that, as the data aggregation ratio S decreases, the weight decreases and the importance of minimum numbers of hops from the root increases. In addition, in the method of the embodiment, the numbers of hops are significantly reduced as compared to the (3,2)-LAST method. In the (3,2)-LAST method, it can be seen that an increase in the numbers of hops leads to an increase in energy because the (3,2)-LAST method is MST-based.

Figure 13:
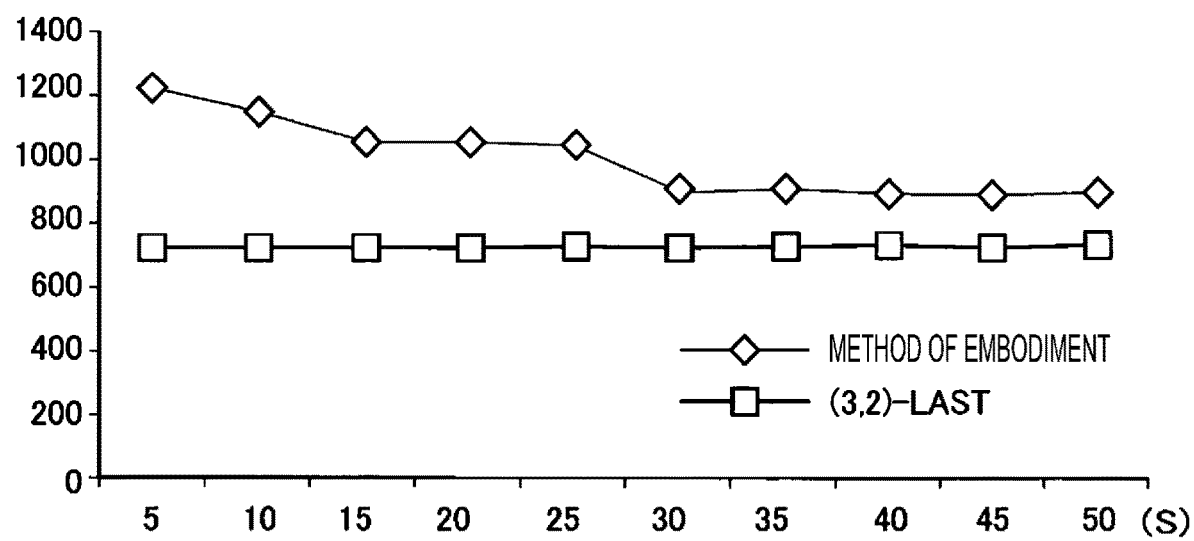
FIG. 13 is a diagram illustrating the effects of the present embodiment.

FIG. 13 illustrates a comparison of the number of nodes in the tree of the embodiment with that of the method of the related art ((3,2)-LAST). (3,2)-LAST has a significantly smaller number of nodes. This difference in the number of nodes is due to the difference in the number of relay nodes used. (3,2)-LAST involves minimizing the number of links in the tree because it is MST-based. Thus, (3,2)-LAST achieves such a decrease in the number of relay nodes. Such a decrease in the total number of links in the tree is highly effective when the data aggregation ratio S is large. In the method of the embodiment, it can be seen that the number of links in the tree can also be reduced due to a reduction in the number of relay nodes because weight=aS and the probability that relay nodes will be selected is low when the data aggregation ratio S is large.

Example of Hardware Configuration of Path Selection Apparatus

Figure 14:
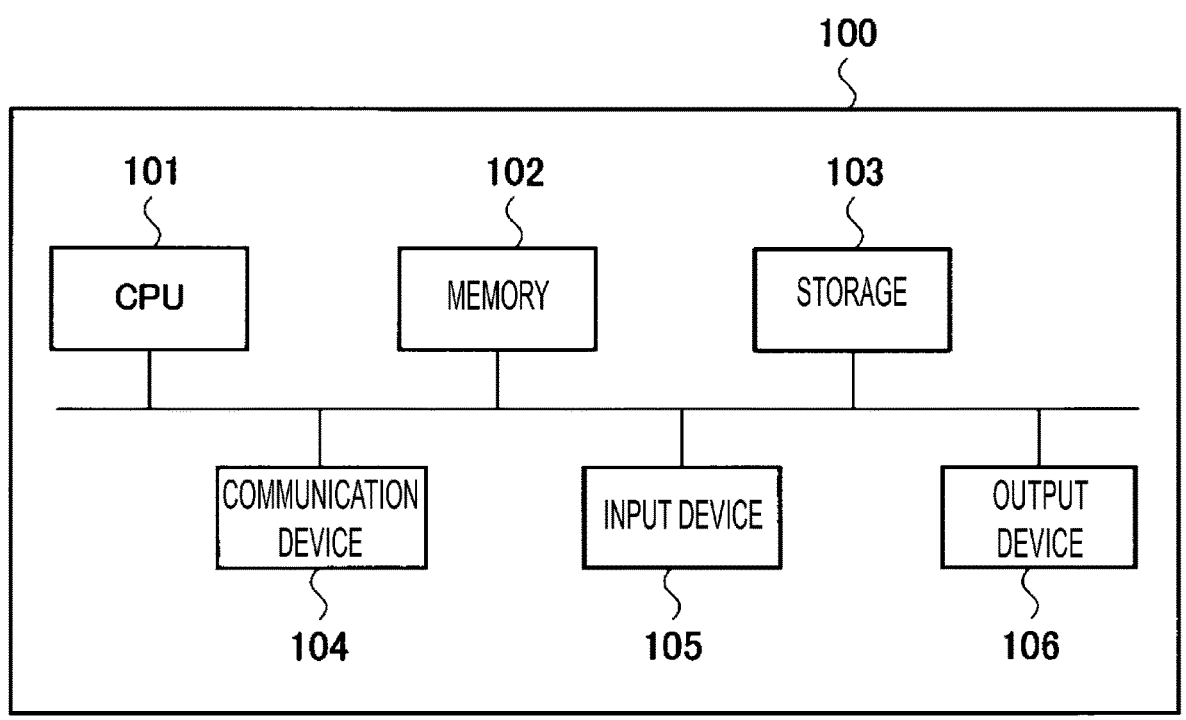
FIG. 14 is a diagram illustrating an example of a hardware configuration of the path selection apparatus of the present embodiment.

FIG. 14 illustrates an example of a hardware configuration of the path selection apparatus 100 according to the embodiment of the present invention. The path selection apparatus 100 may be included in an apparatus connected to the root node (0) as described above. The path selection apparatus 100 may be, for example, a general-purpose computer system including a central processing unit (CPU or processor) 101, a memory 102, a storage 103 (a hard disk drive (HDD) or a solid state drive (SSD)), a communication device 104, an input device 105, and an output device 106 as illustrated in FIG. 14. The memory 102 and the storage 103 are storage devices. In this computer system, each function of the path selection apparatus 100 is implemented by the CPU 101 executing a predetermined program loaded into the memory 102.

The path selection apparatus 100 may be implemented by one computer or may be implemented by a plurality of computers. The path selection apparatus 100 may also be a virtual machine implemented on a computer.

The program for the path selection apparatus 100 can be stored in a computer-readable recording medium such as an an HDD, an SSD, a universal serial bus (USB) memory, a compact disc (CD), or a digital versatile disc (DVD) or can also be delivered via a network.

Characteristic Configurations and Effects

As described above, the path selection apparatus 100 according to the embodiment of the present invention is a path selection apparatus that selects a path in a sensor tree in a wireless sensor network including a plurality of nodes including a sensor node and a relay node, the path selection apparatus including the node information acquisition unit 110 configured to acquire information on the nodes and the path determination unit 130 configured to determine a path in the sensor tree based on the information on the nodes acquired by the node information acquisition unit 110, wherein the path determination unit 130 is configured to use node costs of a sensor node and a relay node in the wireless sensor network and weight a path cost of a path passing through the relay node. As a result, it is possible to provide a path selection apparatus 100 that can reduce the total amount of energy used by the nodes in the sensor tree and significantly reduce the processing time of tree generation.

Specifically, the path determination unit 130 may be configured to, when the node is a sensor node, store 1 which is the node cost of the sensor node in a memory area as the path cost, and when the node is a relay node, store a sum of 1 and a weight for the relay node (1+weight) in a memory area as the path cost. As a result, the path cost can be easily changed depending on the type of the destination of the path unlike the Dijkstra algorithm.

The path determination unit 130 may also be configured to set the weight as a positive number and increase the weight as a data aggregation ratio S increases. As a result, when the data aggregation ratio S is large, it becomes more difficult to select relay nodes as tree nodes, thus enhancing the aggregation effect.

The path determination unit 130 may also be configured to define weight=aS with a as a positive parameter and increase a value of the weight in proportion to the data aggregation ratio S. As a result, when the data aggregation ratio S is large, it becomes more difficult to select relay nodes as tree nodes, thus enhancing the aggregation effect.

The path determination unit 130 may also be configured to continue selecting a tree node until all sensor nodes are set as tree nodes in the sensor tree, and if a relay node that does not transmit or receive a sensor report is present in a generated tree, delete the relay node. This makes it possible to reliably delete relay nodes which are meaningless as members of the tree.

A path selection method according to an embodiment of the present invention is a method for the path selection apparatus 100 to select a path in a sensor tree in a wireless sensor network including a plurality of nodes including a sensor node and a relay node, the path selection method including a node information acquisition step of acquiring information on the nodes, and a path determination step of determining a path in the sensor tree based on the information on the nodes acquired in the node information acquisition step, wherein the path determination step includes using node costs of a sensor node and a relay node in the wireless sensor network and weighting a path cost of a path passing through the relay node. As a result, it is possible to provide a path selection method that can reduce the total amount of energy used by the nodes in the sensor tree and significantly reduce the processing time of tree generation.

A path selection program according to an embodiment of the present invention is a path selection program that causes a computer to function as the path selection apparatus 100. As a result, it is possible to provide a path selection program that can reduce the total amount of energy used by the nodes in the sensor tree and significantly reduce the processing time of tree generation.

REFERENCE SIGNS LIST

100 Path selection apparatus
110 Node information acquisition unit
120 Tree generation request unit
130 Path determination unit
131 WSN recognition unit
132 Tree generation unit
140 WSN storage unit
150 Tree storage unit

The invention claimed is:

1. A path selection apparatus that selects a path in a sensor tree in a wireless sensor network including a plurality of nodes including a sensor node and a relay node, the path selection apparatus comprising:

a node information acquisition unit, including one or more processors, configured to acquire information on the plurality of nodes; and a path determination unit, including one or more processors, configured to determine a path in the sensor tree based on the information on the plurality of nodes acquired by the node information acquisition unit, wherein the path determination unit is configured to:

use node costs of the sensor node and the relay node in the wireless sensor network and weight a path cost of a path passing through the relay node; and continue selecting a tree node until all of a plurality of sensor nodes are set as tree nodes in the sensor tree, and if, among a plurality of relay nodes, a relay node that does not transmit or receive a sensor report is present in a generated tree, delete the relay node.

2. The path selection apparatus according to claim 1, wherein the path determination unit is configured to, when the node is the sensor node, store 1 which is the node cost of the sensor node in a memory area as the path cost, and when the node is the relay node, store a sum of 1 and a weight for the relay node (1+weight) in a memory area as the path cost.

3. The path selection apparatus according to claim 2, wherein the path determination unit is configured to set the weight as a positive number and increase the weight as a data aggregation ratio S increases.

4. The path selection apparatus according to claim 3, wherein the path determination unit is configured to define weight=aS with a as a positive parameter and increase a value of the weight in proportion to the data aggregation ratio S.

5. A path selection method for a path selection apparatus to select a path in a sensor tree in a wireless sensor network including a plurality of nodes including a sensor node and a relay node, the path selection method comprising:
acquiring information on the nodes; and
determining a path in the sensor tree based on the information on the plurality of nodes,
wherein the determining of a path includes using node costs of the sensor node and the relay node in the wireless sensor network and weighting a path cost of a path passing through the relay node and selecting, continuously, a tree node until all of a plurality of sensor nodes are set as tree nodes in the sensor tree, and if, among a plurality of relay nodes, a relay node that does not transmit or receive a sensor report is present in a generated tree, delete the relay node.

6. A non-transitory computer readable medium storing one or more instructions causing a computer to execute:
selecting a path in a sensor tree in a wireless sensor network including a plurality of nodes including a sensor node and a relay node, comprising:
acquiring information on the nodes; and
determining a path in the sensor tree based on the information on the plurality of nodes,
wherein the determining of a path includes using node costs of the sensor node and the relay node in the wireless sensor network and weighting a path cost of a path passing through the relay node and continuing selection of a tree node until all of a plurality of sensor nodes are set as tree nodes in the sensor tree, and if, among a plurality of relay nodes, a relay node that does not transmit or receive a sensor report is present in a generated tree, delete the relay node.

7. The path selection method according to claim 5, further comprising:
setting the weight as a positive number and increase the weight as a data aggregation ratio S increases.

8. The path selection method according to claim 7, further comprising:
defining weight=aS with a as a positive parameter and increase a value of the weight in proportion to the data aggregation ratio S.

9. The non-transitory computer readable medium according to claim 6, further comprising:
setting the weight as a positive number and increase the weight as a data aggregation ratio S increases.

10. The non-transitory computer readable medium according to claim 9, further comprising:
defining weight=aS with a as a positive parameter and increase a value of the weight in proportion to the data aggregation ratio S.

* * * * *